PEI CHING LI  3,563,716
POTTING QUARTZ GLASS FIBER BUNDLE ENDS
Filed May 17, 1968
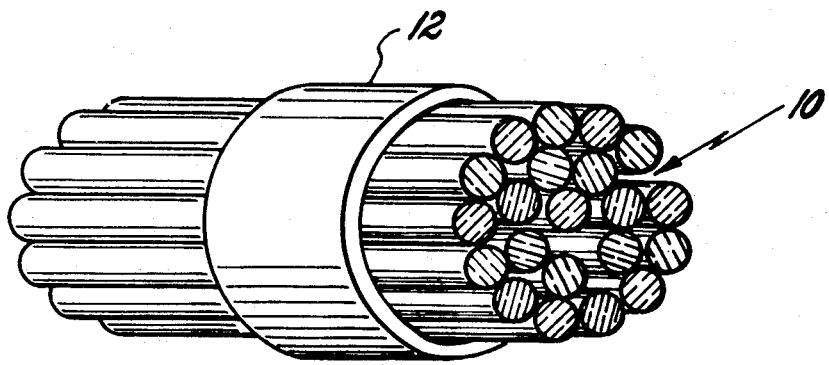
INVENTOR.
Pei Ching Li
BY Harry A. Herbert Jr.
George Fine
ATTORNEYS United States Patent Office 3,563,716
Patented Feb. 16, 1971

3,563,716
POTTING QUARTZ GLASS FIBER BUNDLE ENDS
Pei Ching Li, Northbrook, Ill., assignor to the United States of America as represented by the Secretary of the Air Force
Filed May 17, 1968, Ser. No. 730,109
Int. Cl. C03c 11/08, 23/20
U.S. Cl. 65—4                                                2 Claims

ABSTRACT OF THE DISCLOSURE

The apparatus and method to accomplish fusion of the ends of a bundle of glass fibers by first enclosing the fiber bundle ends within a short length of glass tubing, and then applying the amount of heat necessary to integrate the fibers and the quartz tubing or collar into a single mass.

BACKGROUND OF THE INVENTION

The present invention relates to the method and apparatus of potting quartz glass fiber bundle ends. More specifically, the invention relates to fusing the combination of short quartz collars or caps and quartz glass fiber bundle ends into a integral mass.

One widely used method of holding optical fibers in a bundle is by using a potting cement. The principal requirements of a potting cement for binding the ends of bundles (coated or uncoated fibers) are stability to ultraviolet radiation and usability over a wide temperature range. Further, it is desirable that the material which is utilized as the potting cement exhibit chemical inactivity towards the core and the coating materials. Many commercial silicone base optical cements are available as potting agents, but are limited to relatively low temperature use (in the range of —40° to 200° C.). Researchers in the art have made extensive studies on the use of cellulose caprate as a possible potting cement and have found that it has excellent temperature and ultraviolet stability characteristics. The studies have not indicated whether this material could be satisfactorily used as a potting agent in the ultraviolet range of 2000 to 3000 A.

A similar preliminary study has been conducted to determine whether Corning's Kovar sealing glass has the temperature and ultraviolet stability characteristics to allow it to be used as a a potting agent. The material is prepared by ball-milling in acetone. The process of potting quartz glass fiber bundle ends is accomplished by dipping the end of the fiber bundle into the prepared colloidal suspension, then the bundle is dried and fused at a temperature close to the softening point (708° C.) of the sealing glass. The early results, using this method of potting, appeared encouraging but the thermal expansion differences between the quartz glass fibers and the sealing glass were too excessive to produce a satisfactory bonding.

Various other materials were tested to determine the feasibility of their use as potting agents, two such commercially available products, Monsanto's colloidal liquid aluminum phosphate and Sylvania's PS-7 potassium silicate, were tested to determine whether these compounds had the desired characteristics. The results which were achieved using these compounds did not meet the required criteria because of lack of thermal stability.

Alternate methods of potting the ends of a fiber bundle by direct fusion by using a controlled heating depth approach were investigated. These early experiments were generally not encouraging, since the loose ends of the bundle often tended to flare outward upon heating so that the individual filaments did not form a unified mass. Furthermore, inclusion of bubbles in the fused end, and filament weakness at the fusion junction, presented serious problems.

To alleviate these problems, caps of Vycor, quartz and Pyrex were tested. Results were improved, but the occlusion of bubbles was still too high. The mismatch of thermal expansion coefficients of quartz and Pyrex, caused the Pyrex cap, after being fused on, to crack on cooling. Vycor and quartz demonstrated excellent expansion compatibility.

SUMMARY OF THE INVENTION

The present invention describes a method of directly fusing the fiber bundle ends with short quartz collars or caps. This procedure provides stability to ultraviolet radiation and usability over a wide temperature range.

Direct fusion of quartz glass fiber bundle ends was found to produce a transition brittle zone as well as other defects. Fused ends were, therefore, produced by using a short length of quartz tube as a collar on the bundle with about ⅛ inch of the filament ends exposed outside the collar. The fiber bundle and collar, after fusion, formed an integral, hemispherical end. The ¼ to ⅜ inch long quartz collars which were used proved satisfactory and shorter lengths were unsatisfactory since the filaments were too weak near the end.

It is one object of the invention, therefore, to improve the optical properties of the fused quartz glass fiber bundle.

It is another object to provide a fused quartz glass fiber bundle having a substantially flat end rather than a hemispherical one.

It is also another object to provide a fused quartz glass fiber bundle having transmission properties usable in the ultraviolet range of 2000 A to 3000 A.

It is a further object to provide a quartz glass fiber bundle which is particularly suitable for exposure to 1000° F. environments.

It is yet another object to provide a method of directly fusing quartz glass fiber bundles with quartz collars.

These and other advantages, features and objects of the invention will become more apparent from the following description taken in connection with the illustrative embodiment in the accompanying drawing, wherein the figure is a perspective view of the quartz glass fiber bundle and the quartz collar.

DESCRIPTION OF THE PREFERRED EMBODIMENT

As will be clear from the drawing, the method of directly fusing quartz glass fiber bundle ends with short quartz collars or caps is highly superior to any other method currently available to pot optical quartz fibers for use in the ultraviolet range of 2000 A. to 3000 A. and for use in monitoring environments where the temperature can reach 1000° F. The quartz glass fiber bundle 10 is assembled by collecting the number of individual quartz glass fiber threads required to achieve a desired bundle diameter. The bundle diameter is wholly dependent upon the number and the diameter of the quartz glass threads. While it is feasible and satisfactory results may be achieved by using quartz glass fiber threads of varying diameters to constitute a bundle, the preferred embodiment favors utilizing quartz glass fiber threads of substantially the same diameter. It may also be noted that either a coated or uncoated fiber may be used in forming a bundle to be potted, the embodiment which is illustrated by the drawing prefers a quartz glass fiber with a thin coating of magnesium fluoride. A thin coating of magnesium fluoride (average thickness 13 A. to 16 A.) does not provide optical insulation of the quartz glass fiber core because the boundary wave penetration of light incident on the core coating interface is greater than the coating thickness. The lack of optical insulation is of little significance when the bundle is considered as a whole since it is only the outermost fibers which will be affected. The innermost fibers will have sufficient optical insulation so that incidental interference will be minor. It is also possible to coat the outside fibers of the entire potted bundle with a thicker coating to provide optical insulation if a particular application requires it. However, the magnesium fluoride coating does prevent absorption of water vapor by the quartz glass fiber surface and significantly increases the resistance of the quartz glass fiber to abrasion.

The quartz collar 12 is utilized to provide structural support to the quartz glass fiber bundle during and after the direct fusion of the quartz glass fiber bundle ends and the quartz collar. In processes utilizing a direct fusion of quartz glass fiber bundle ends, it was found that a brittle transition zone as well as other defects were produced. The present method eliminates these problems. The quartz collar 12 which has a tubular configuration in the preferred embodiment has substantially the same internal diameter dimension as the quartz glass fiber bundle outside diameter. The improved fused end was produced by using a quartz collar having a length of approximately ¼ to ⅜ inch long and allowing the quartz glass fiber bundle ends to protrude approximately ⅛ inch beyond the upper portion of the quartz collar 12. The use of collars having shorter lengths produced fused fiber ends which were too weak near the end. During the initial stages of the fusion process, the quartz collar 12 is held in position on the quartz glass fiber bundle by means of the press fit existing therebetween. As the fusion process takes place, the quartz collar and the quartz glass fiber bundle begin to form a single integrated mass. In order to bring about the fusion of a given mass of any amorphous material, a definite quantity of heat is required. The quantity of heat which is required per unit mass, without any change of temperature, is called the heat of fusion of the substance. The heat of fusion of quartz glass is approximately 1700° C. and may be supplied by any of the presently available commercial means, such as an induction furnace. Thus, when the quartz collar 12 and quartz glass fiber bundle 10 is sufficiently heated, the molecules break loose from their stable configuration and wander about or diffuse among each other. When this condition has become general, the materials exhibit the characteristics of a liquid, and we say that they have undergone fusion. Thus the quartz glass fiber bundle and quartz collars, after fusion, form an integral hemispherical end. As a further improvement in the fusing process, an open flame was applied at the center of the bundle end and was gradually moved toward the outer edge of the bundle, while the bundle was simultaneously rotated. This additional refinement in the fusion process, not only enhances the fusion process itself, but results in producing a substantially flat end rather than a hemispherical one. In most applications, the flat end is most desirable. After the fusion process is completed, the fused combination of the quartz glass fiber bundle and the quartz collar is maintained within the induction furnace to allow the fused combination to return to room temperature. The direct fusion method of the quartz glass fiber bundle end with a short quartz collar described above produces optical bundles which are particularly suited for use in the ultraviolet range of 2000 A. to 3000 A. and for use in environments in which temperatures reach 1000° F.

Although the invention has been described with reference to a particular embodiment, it will be understood to those skilled in the art that the invention is capable of a variety of alternative embodiments within the spirit and scope of the appended claims.

I claim:

1. The method of fusing a quartz glass fiber bundle and a quartz collar in an induction furnace which comprises: inserting said quartz glass fiber bundle into said quartz collar; protruding the ends of said quartz glass fiber bundle ⅛ inch beyond said quartz collar end; applying the heat of fusion to said quartz glass fiber bundle and said quartz collar to fuse them into a single integral mass; rotating said integral mass while applying an open flame to the end of said quartz glass fiber bundle; and maintaining said fused integral mass within said induction furnace, after the fusion of said quartz glass fiber bundle and said quartz collar is complete, to allow said fused integral mass to return to room temperature.

2. The method of potting quartz glass fiber bundle ends in an induction furnace which comprises: inserting said quartz glass fiber bundle ends into a quartz glass collar, positioning said quartz glass collar about ⅛ inch from said quartz glass fiber bundle ends; heating said quartz glass fiber bundle ends and said quartz glass collar to its heat of fusion, maintaining the fused combination with said induction furnace to allow said fused combination to return to room temperature; and coating said fused combination with magnesium fluoride to provide optical insulation.

References Cited

UNITED STATES PATENTS

| | | | |
|---|---|---|---|
| 1,645,086 | 10/1927 | Berry et al. | 65—Quartz Dig. |
| 2,987,372 | 6/1961 | Olt et al. | 65—108X |
| 3,037,241 | 6/1962 | Bazinet, Jr., et al. | 65—LR Dig. |
| 2,608,722 | 9/1952 | Stuetzer | 65—LR Dig. |
| 3,148,967 | 9/1964 | Hick, Jr. | 65—LR Dig. |
| 3,204,326 | 9/1965 | Granitsas | 65—LR Dig. |
| 3,227,032 | 1/1966 | Upton | 65—LR Dig. |
| 3,278,283 | 10/1966 | Bazinet, Jr. | 65—4 |
| 3,253,896 | 5/1966 | Woodcock et al. | 65—4X |
| 3,261,676 | 7/1966 | Morelock | 65—3X |
| 3,395,006 | 7/1968 | Hopkins et al. | 65—12 |

FRANK W. MIGA, Primary Examiner

U.S. Cl. X.R.

65—38, 60; 350—96